United States Patent [19]
Iwashita et al.

[11] Patent Number: 5,620,237
[45] Date of Patent: Apr. 15, 1997

[54] BRAKE DEVICE FOR MOTORCYCLE

[75] Inventors: Kanau Iwashita; Tetsuo Tsuchida, both of Saitama, Japan

[73] Assignee: Honda Giken Kogyo Kabushiki Kaisha, Tokyo, Japan

[21] Appl. No.: 366,481

[22] Filed: Dec. 30, 1994

[30] Foreign Application Priority Data

Dec. 30, 1993 [JP] Japan .................... 5-352040

[51] Int. Cl.⁶ ......................................... B60T 8/26
[52] U.S. Cl. .................... 303/9.64; 188/349; 188/106 P
[58] Field of Search ..................... 303/9.61, 9.64, 303/9.71; 188/344, 345, 349, 106 P

[56] References Cited

U.S. PATENT DOCUMENTS

| | | | |
|---|---|---|---|
| 3,960,030 | 6/1976 | Williams | 188/106 P |
| 4,239,294 | 12/1980 | Burgdorf | 303/9.64 |
| 4,923,027 | 5/1990 | Hayashi et al. | 303/9.64 |
| 5,219,211 | 6/1993 | Tsuchida et al. | 303/9.64 |
| 5,273,346 | 12/1993 | Tsuchida et al. | 303/9.64 |
| 5,372,408 | 12/1994 | Tsuchida et al. | 303/9.64 |
| 5,544,946 | 8/1996 | Toyoda et al. | 188/106 P |

FOREIGN PATENT DOCUMENTS

| | | | |
|---|---|---|---|
| 2696697 | 4/1994 | France | 303/9.64 |
| 3-120286 | 12/1991 | Japan . | |

*Primary Examiner*—Robert J. Oberleitner
*Assistant Examiner*—Chris Schwartz

[57] ABSTRACT

A front/rear interlocking brake system is provided wherein a hydraulic pressure is directly supplied through a lever hydraulic system and a circuit to front brakes. The front brake is provided with a secondary master cylinder for generating a hydraulic pressure due to a brake torque of the front brake. The secondary master cylinder is connected through a lever interlocking hydraulic system and a control valve to a rear brake. A hydraulic pressure is directly supplied from a primary master cylinder through a pedal hydraulic system to the rear brake. Accordingly, the front brakes and the rear brake can be interlockingly operated by operating the lever, and only the rear brake can be operated by operating the pedal.

31 Claims, 8 Drawing Sheets

BRAKE DEVICE FOR MOTORCYCLE

BACKGROUND OF THE INVENTION

1. Field of the Invention

The present invention relates to a brake device for a motorcycle having front and rear interlocking hydraulic brakes operatively connected to front and rear wheels.

2. Description of Background Art

Various types of a brake device are known. For example, the brake device disclosed in Japanese Utility Model Laid-open No. 3-120286 includes a front brake having a primary brake to be operated directly by operating a lever and a secondary brake using a brake torque of the primary brake. The primary brake is provided with a secondary master cylinder for generating a hydraulic pressure due to the brake torque of the primary brake. A hydraulic pressure generated by operating a pedal is supplied to the secondary master cylinder to generate a secondary hydraulic pressure. The secondary hydraulic pressure is then supplied to both the secondary brake of the front brake and a rear brake in an interlocking manner. FIG. 2B is a graph illustrating the distribution of a brake force according to the conventional system.

OBJECTS AND SUMMARY OF THE INVENTION

In the above-mentioned structure, the rear brake is always interlocked with the front brake. However, when cornering or the like during sport-like operation of the vehicle, it is sometimes desired to control a running speed by using only the rear brake. It is therefore an object of the present invention to provide a brake device for a motorcycle which can satisfy such a desire.

The above-mentioned problem can be solved by the following means. According to the present invention, a brake device is provided for a motorcycle having a front brake at a front wheel and a rear brake at a rear wheel. The front brake and the rear brake are operated by hydraulic pressure. The brake device comprises a lever hydraulic system connected to the front brake for supplying the hydraulic pressure to the front brake by operating a lever. A lever inter-locking hydraulic system is connected to the rear brake for supplying the hydraulic pressure to the rear brake by operating the lever, and a pedal hydraulic system is connected to the rear brake for supplying the hydraulic pressure to the rear brake by operating a pedal.

According to the present invention, the lever interlocking hydraulic system has a secondary master cylinder for generating a hydraulic pressure by operating the lever.

According to the present invention, the secondary master cylinder generates the hydraulic pressure by receiving a brake torque of the front brake.

According to the present invention, the secondary master cylinder is operated by a wire operatively connected to the lever.

According to the present invention, generation of the hydraulic pressure in the secondary master cylinder is controlled by a control device according to the operation of the lever.

According to the present invention, the control device controls the secondary master cylinder according to a signal output from a detector for detecting a brake torque of the front brake.

According to the present invention, the control device controls the secondary master cylinder according to a signal output from a brake switch adapted to be opened and closed by operation of the lever and a pressure signal indicative of the hydraulic pressure detected in the lever hydraulic system.

According to the present invention, the control device controls the secondary master cylinder according to an amount of rotation of the lever.

According to the present invention, the hydraulic pressure generated from the secondary master cylinder is controlled by a control valve provided in the lever interlocking brake system.

According to the present invention, a pressure signal indicative of the hydraulic pressure generated from the secondary master cylinder is fed back to the control device to control the hydraulic pressure.

When the pedal is operated to generate a hydraulic pressure in a primary master cylinder connected to the pedal, this hydraulic pressure is supplied through the pedal hydraulic system to the rear brake. Thus, the rear brake is operated by operating only the pedal to effect brake control independently of the front brake. As a result, a characteristic of distribution of the front and rear brake forces in this case becomes that as shown in FIG. 2A such that no brake force is distributed from the pedal hydraulic system to the front brake.

When the lever is operated, a hydraulic pressure generated in a primary master cylinder connected to the lever is supplied to the front brake, and in interlocking relationship with this lever operation, a hydraulic pressure is supplied through the lever interlocking hydraulic system to the rear brake. Thus, the rear brake is operated together with the front brake in an interlocking manner.

Figure 2A:
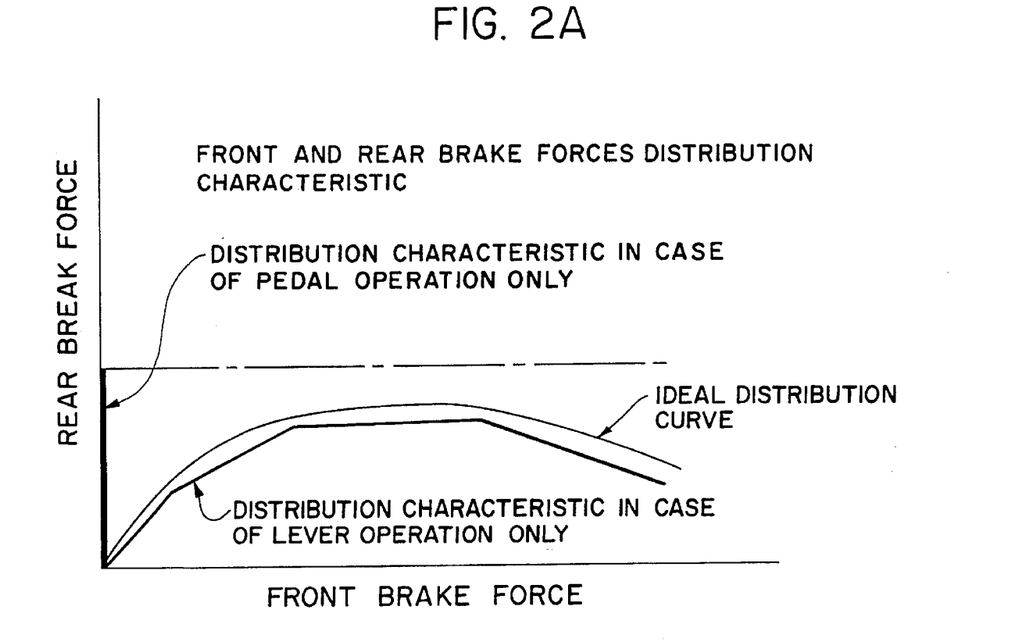
FIG. 2A is a characteristic graph of distribution of a brake force according to the present invention.
Figure 2B:
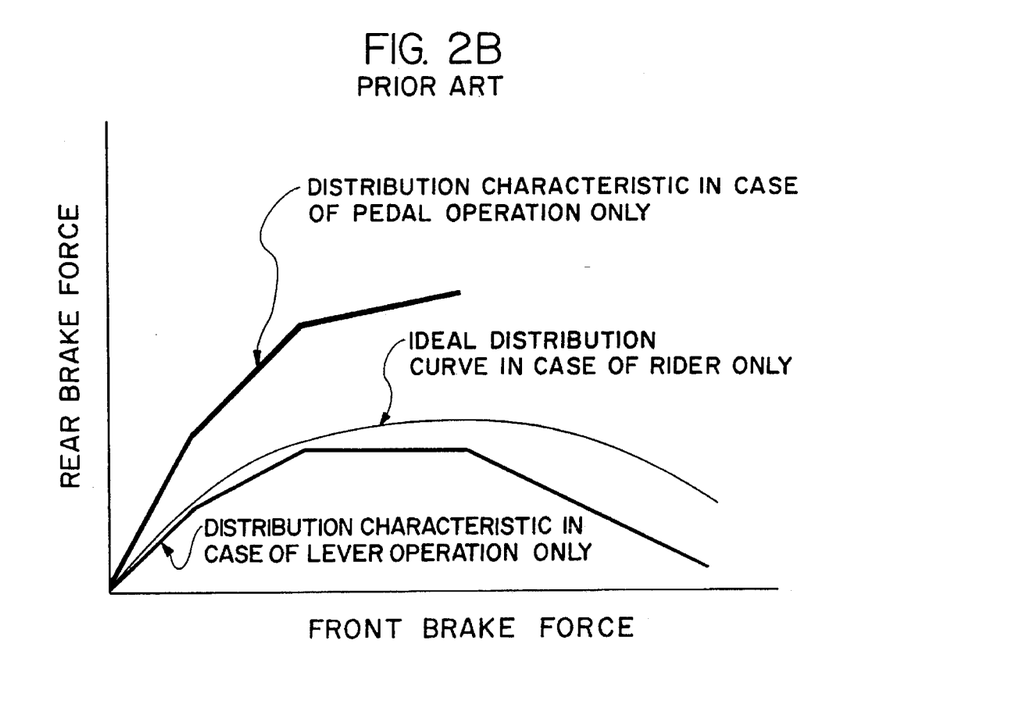
FIG. 2B is a graph illustrating a conventional system.

It is desirable that the distribution of front and rear brake forces in this case is controlled so as to approach an ideal distribution curve as shown in FIG. 2A.

When the secondary master cylinder is provided in the lever interlocking hydraulic system, a hydraulic pressure is generated in the secondary master cylinder by operating the lever. In case the secondary master cylinder is provided at the front brake, the secondary master cylinder is operated by utilizing a brake torque of the front brake.

When the wire to be operated by the lever is connected to the secondary master cylinder, the hydraulic pressure is generated in the secondary master cylinder by operating the lever to simultaneously operate the secondary master cylinder through the wire.

When the control device is employed, the operation of the secondary master cylinder can be controlled by the control device according to the operation of the lever.

In this case, a signal on which the control by the control device is based can be made dependent upon a brake torque of the front brake, the act of rotation of the lever and a hydraulic pressure in the lever hydraulic system, or a stroke of the lever.

More specifically, when a detector for detecting a brake torque of the front brake is provided, the secondary master cylinder can be controlled according to a torque signal output from the detector means.

When a brake switch for detecting whether or not the lever has been rotated is provided and a pressure sensor for detecting a hydraulic pressure is provided in the lever hydraulic system, the secondary master cylinder can be controlled according to a lever rotation signal output from the brake switch and a pressure signal output from the pressure sensor.

When a stroke sensor for detecting a lever stroke, or an amount of rotation of the lever is provided, the secondary master cylinder can be controlled according to a stroke signal output from the stroke sensor.

Further, when the control valve is provided between the secondary master cylinder and the rear brake, the hydraulic pressure to be supplied from the secondary master cylinder to the rear brake can be controlled so as to approach the ideal distribution curve as shown in FIG. 2A.

When the hydraulic pressure generated from the secondary master cylinder is subjected to feedback control by the control device, this hydraulic pressure can be similarly controlled without the control valve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Figure 1:
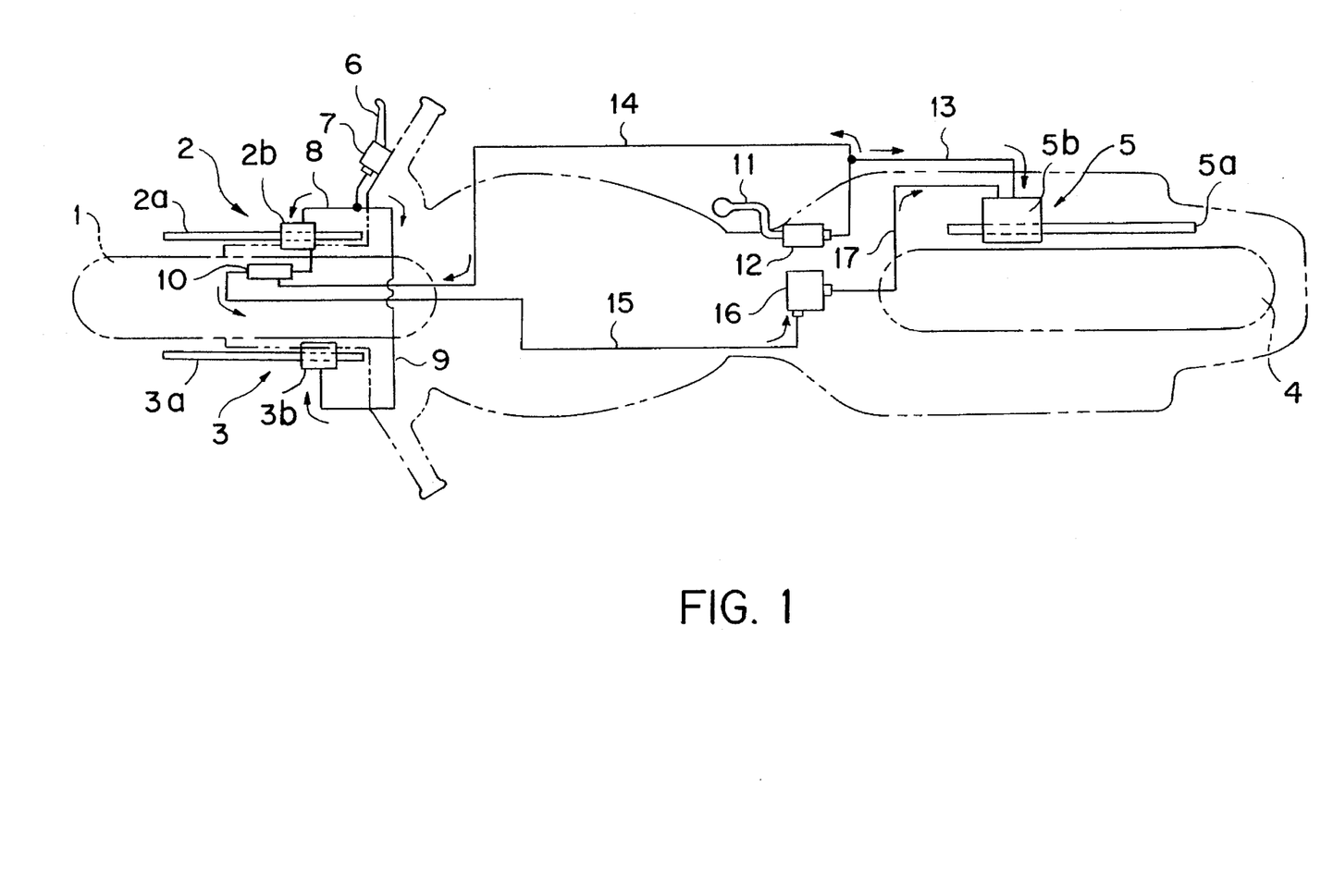
FIG. 1 is a schematic view of a brake system according to a first preferred embodiment of the present invention shown together with an outline of a motorcycle.
Figure 3:
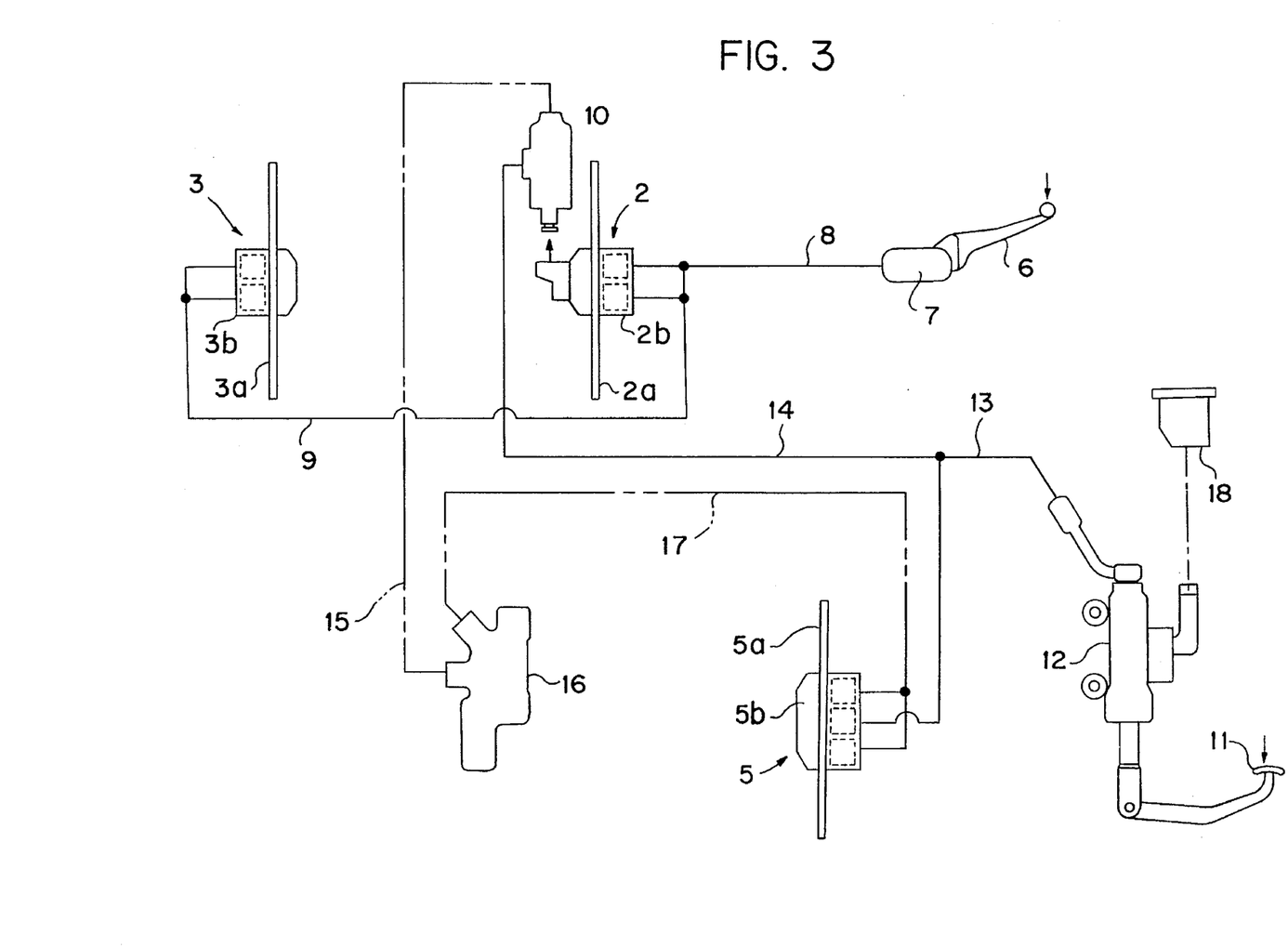
FIG. 3 is a diagram of the brake system according to the first preferred embodiment.

A first preferred embodiment of the present invention will now be described with reference to FIGS. 1 and 3. FIG. 1 is a diagrammatic plan view of a brake system according to the first preferred embodiment shown in relation to a motorcycle, and FIG. 3 is a diagram showing the details of the brake system.

Referring first to FIG. 1, a front wheel 1 is provided with hydraulic front brakes 2 and 3 as the front brake in the present invention. A rear wheel 4 is provided with a hydraulic rear brake 5.

A hydraulic pressure is supplied from a primary master cylinder 7 of a lever 6 through a lever hydraulic system 8 to the front brake 2. A part of this hydraulic pressure is supplied to the front brake 3 from a circuit 9 branched from the lever hydraulic system 8. The circuit 9 constitutes a part of the lever hydraulic system 8.

The front brake 2 is provided with a secondary master cylinder 10. The secondary master cylinder 10 generates a hydraulic pressure when a brake torque of the front brake 2 is applied thereto. The secondary master cylinder 10 is supplied with a hydraulic pressure from a hydraulic circuit 14 branched from a pedal hydraulic system 13 connected from a primary master cylinder 12 of a pedal 11 to the rear brake 5.

A lever interlocking hydraulic system 15 is connected from the secondary master cylinder 10 through a control valve 16 to the rear brake 5.

As is apparent from FIG. 3, both the front brakes 2 and 3 are two-port type hydraulic brakes, and the same hydraulic pressure is distributed through the lever hydraulic system 8 and the circuit 9 to each port of the front brakes 2 and 3. Front brake disks 2a and 3a of the front brakes 2 and 3, respectively, and front brake calipers 2b and 3b of the front brakes 2 and 3, respectively, are operatively provided relative to each other.

The secondary master cylinder 10 functions to select the higher pressure of the hydraulic pressure by the brake force of the front brake 2 and the hydraulic pressure from the hydraulic circuit 14 and to supply the higher hydraulic pressure to the lever interlocking hydraulic system 15. When only the pedal 11 is operated, the secondary master cylinder 10 functions to merely relay the hydraulic pressure from the hydraulic circuit 14 to the lever interlocking hydraulic system 15.

The control device 16 functions to control the hydraulic pressure in the lever interlocking hydraulic system 15 so that it approaches the ideal distribution curve shown in FIG. 2A. The hydraulic pressure controlled by the control valve 16 is supplied through a pressure control circuit 17 to the rear brake 5. The pressure control circuit 17 constitutes a part of the lever interlocking hydraulic system 15.

The rear brake 5 is a three-port type hydraulic brake. The hydraulic pressure of the primary master cylinder 12 is directly supplied from the pedal hydraulic system 13 to one of the three ports of the rear brake 5, whereas the hydraulic pressure from the pressure control circuit 17 is supplied to the other two ports of the rear brake 5. A rear brake disk 5a of the rear brake 5 and a rear brake caliper 5b of the rear brake 5 are operatively provided relative to each other. Further, a reserve tank 18 is provided for the primary master cylinder 12.

In operation, when only the pedal 11 is operated, the hydraulic pressure of the primary master cylinder 12 is supplied from the pedal hydraulic system 13 to one of the three ports of the rear brake 5, and a part of the hydraulic pressure is supplied from the hydraulic circuit 14, which is branched from the pedal hydraulic system 13, through the secondary master cylinder 10 and the control valve 16 to the other two ports of the rear brake 5.

As is apparent from FIG. 2A, the hydraulic pressure of the primary master cylinder 12 in this case is not applied to the front brakes 2 and 3 at all, but is used for the operation of the rear brake 5 only.

Therefore, only the rear brake 5 can be controlled by the operation of the pedal 11 irrespective of the front brakes 2 and 3, thereby making the speed control suitable for sport-like running.

When only the lever 6 is operated, or both the lever 6 and the pedal 11 are simultaneously operated, the front brakes 2 and 3 and the rear brake 5 are interlockingly operated.

In this case, the hydraulic pressure from the hydraulic circuit 14 is supplied to the secondary master cylinder 10, and if the brake torque generated by the operation of the front brake 2 is greater than this hydraulic pressure, the hydraulic pressure by the brake torque is generated in the secondary master cylinder 10. Accordingly, the higher pressure of the hydraulic pressure generated in the secondary master cylinder 10 and the hydraulic pressure in the hydraulic circuit 14 is supplied from the secondary master cylinder 10 through the lever interlocking hydraulic system 15 to the control valve 16. Then, the hydraulic pressure is controlled by the control valve 16 so as to approach the ideal distribution curve shown in FIG. 2A, and is supplied from the control valve 16 through the pressure control circuit 17 to the rear brake 5. Thus, the rear brake 5 is operated so as to interlock with the front brakes 2 and 3.

As described above, the secondary master cylinder 10 is provided at the front brake 2 or 3 to utilize the brake torque of the front brake 2 or 3, thereby constructing a front/rear interlocking brake system with a relatively simple structure.

Figure 4:
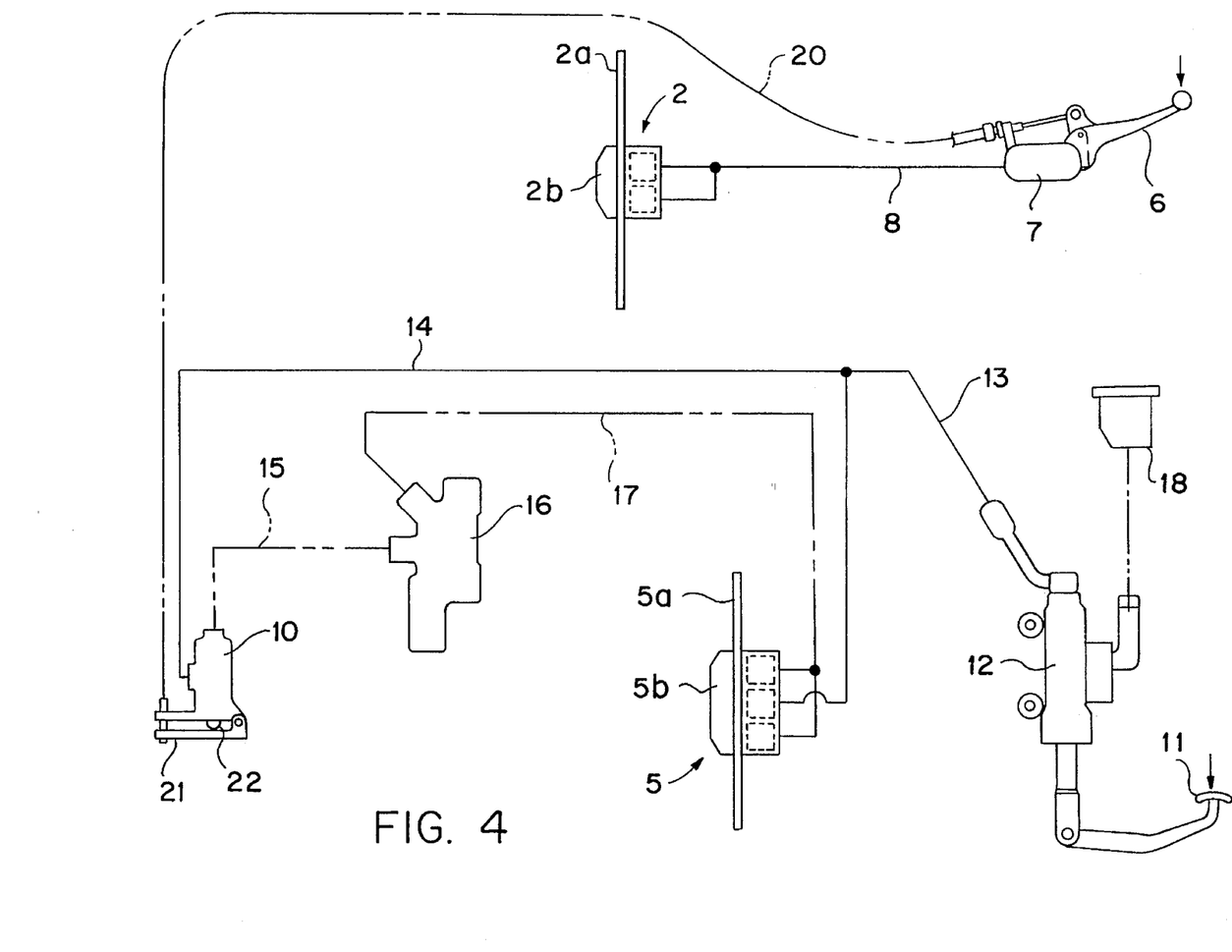
FIG. 4 is a diagram showing a brake system according to a second preferred embodiment of the present invention.

FIG. 4 shows a second preferred embodiment of the present invention. In the second preferred embodiment and other preferred embodiments to be described later, the same functional parts as those in the first preferred embodiment are denoted by the same reference numerals, and the explanation thereof will be omitted unless necessary.

This preferred embodiment differs from the first preferred embodiment by providing a wire 20 connected at one end thereof to the lever 6 which is used as means for generating a hydraulic pressure in the secondary master cylinder 10 so as to interlock with the operation of the lever 6.

The other end of the wire 20 is connected to an operating member 21 pivotally mounted to the secondary master cylinder 10. A piston 22 is operated by pivotal movement of the operating member 21 to generate the hydraulic pressure in the secondary master cylinder 10.

With this arrangement, the front/rear interlocking brake system can be formed relatively simply without so largely changing the conventional structure of the lever 6 and its associated parts. Moreover, the secondary master cylinder 10 is not provided at the front brake 2, so that an unsprung weight can be reduced. In addition, a hydraulic piping of the lever interlocking hydraulic system 15 can be shortened.

Figure 5:
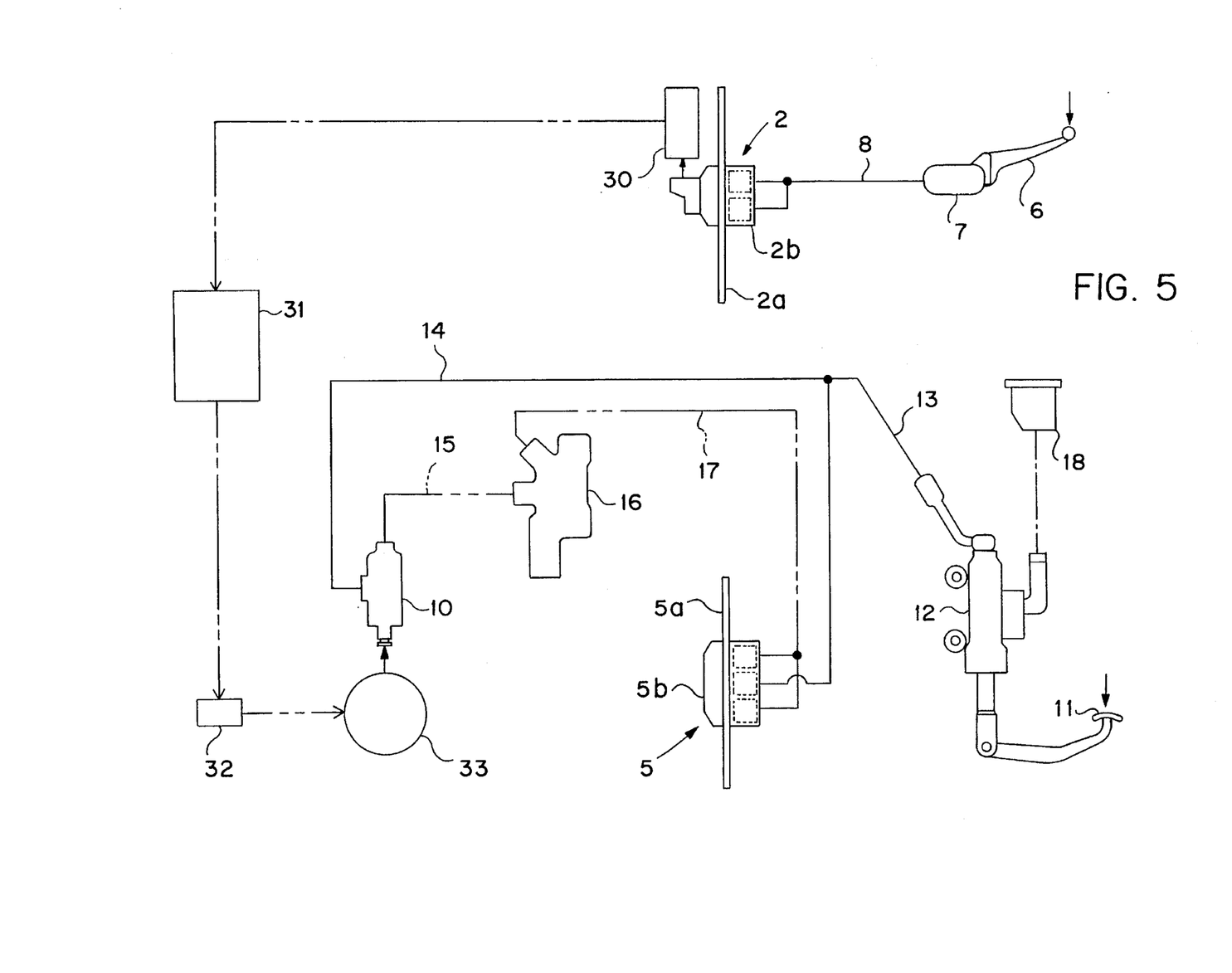
FIG. 5 is a diagram showing a brake system according to a third preferred embodiment of the present invention.

FIG. 5 shows a third preferred embodiment of the present invention. In this preferred embodiment, a detector means 30 for detecting a brake torque of the front brake 2 is provided at the front brake 2, and a torque signal output from the detector means 30 is input into a control unit 31 as the control device in the present invention. The control unit 31 determines a hydraulic pressure to be generated in the secondary master cylinder 10 according to the torque signal, and then operates an actuator 33 through a relay 32 to generate the hydraulic pressure in the secondary master cylinder 10.

With this arrangement, the front/rear interlocking brake system can be formed relatively compactly. Moreover, the secondary master cylinder 10 is not provided at the front brake 2, so that an unsprung weight can be reduced. In addition, a hydraulic piping of the lever interlocking hydraulic system 15 can be shortened.

Figure 6:
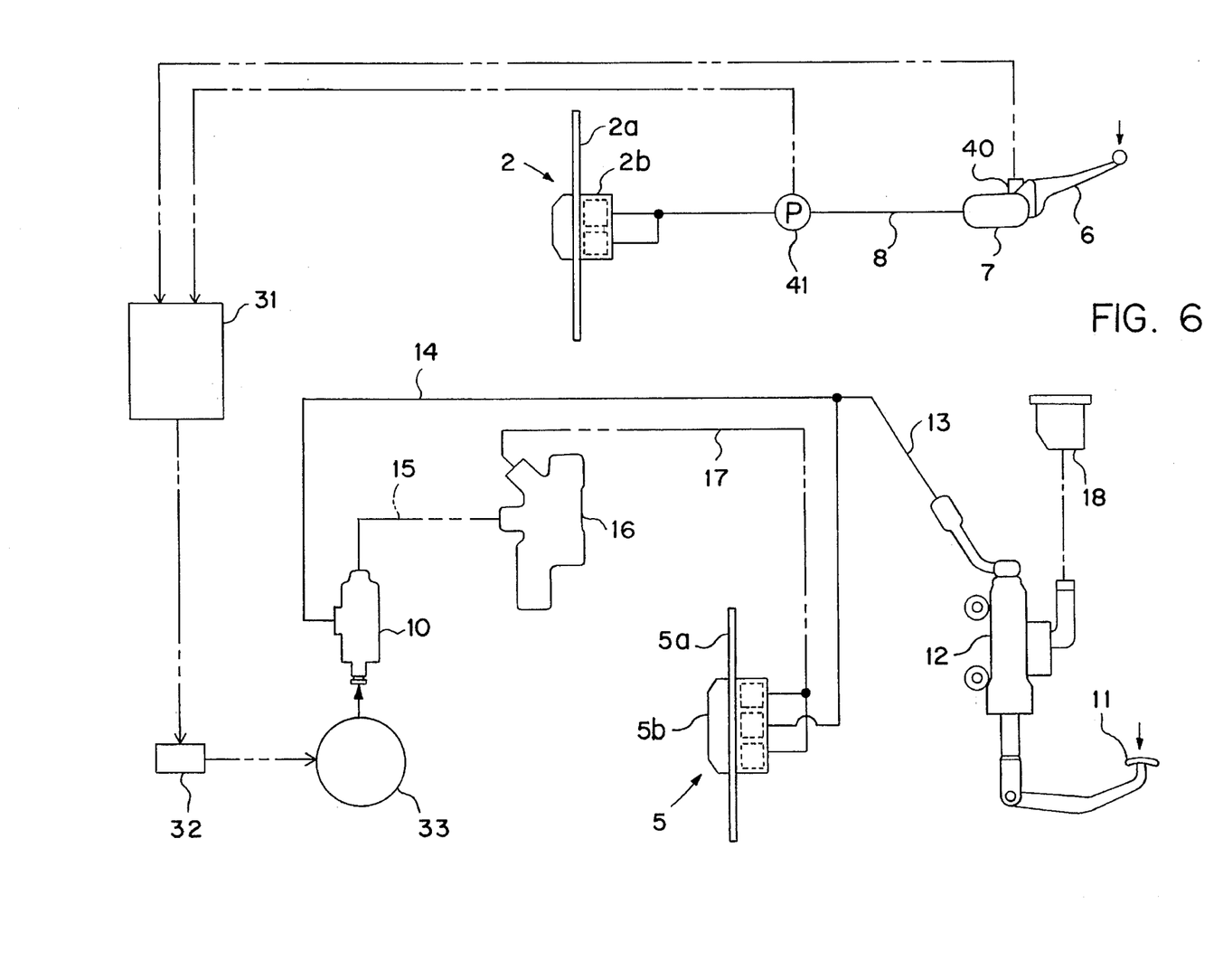
FIG. 6 is a diagram showing a brake system according to a fourth preferred embodiment of the present invention.

FIG. 6 shows a fourth preferred embodiment of the present invention. In this preferred embodiment, a brake switch 40 adapted to be opened and closed according to whether the lever 6 has been rotated or not, and a pressure sensor 41 for detecting a hydraulic pressure in the lever hydraulic system 8 is provided at a mid-position in the lever hydraulic system 8. A lever open/closed signal output from the brake switch 40 and a pressure signal output from the pressure sensor 41 are input into the control unit 31. Then, the control unit 31 controls the secondary master cylinder 10 according to the lever open/closed signal and the pressure signal in the same manner as that in the third preferred embodiment. Also in the fourth preferred embodiment, a hydraulic piping of the lever interlocking hydraulic system 15 can be shortened, and an unsprung weight can be reduced because the secondary master cylinder 10 is not provided at the front brake 2.

Figure 7:
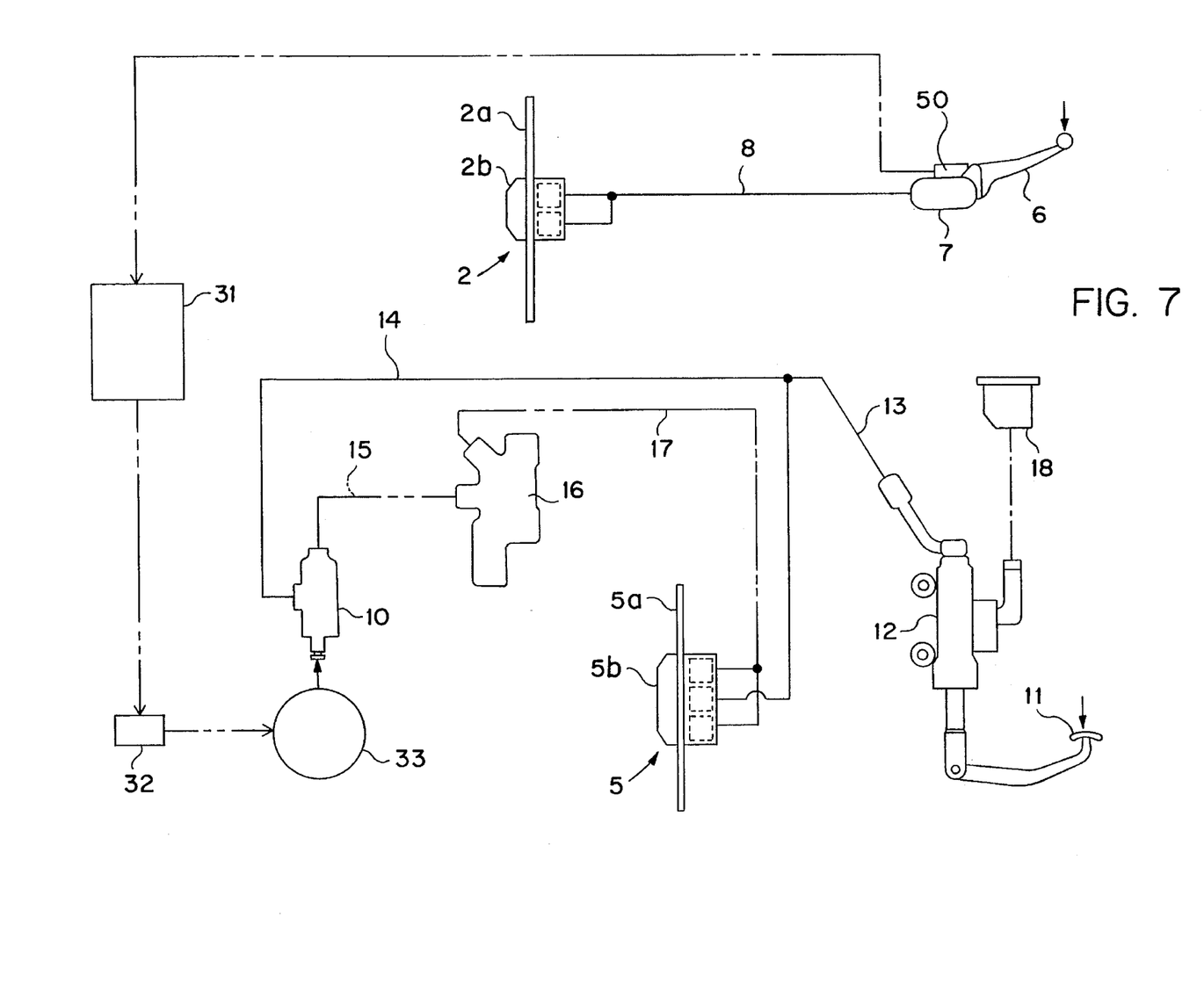
FIG. 7 is a diagram showing a brake system according to a fifth preferred embodiment of the present invention.

FIG. 7 shows a fifth preferred embodiment of the present invention. In this preferred embodiment, a stroke sensor 50 for detecting an amount of rotation of the lever 6 is provided at the lever 6. A stroke signal output from the stroke sensor 50 is input into the control unit 31. Then, the control unit 31 controls the secondary master cylinder 10 according to the stroke signal in the same manner as that in the third and fourth preferred embodiments.

Although the configuration from the control unit 31 to the secondary master cylinder 10 is the same as that in the third and fourth preferred embodiments, the configuration of the brake device as a whole can be made simpler because the control of the secondary master cylinder 10 is made according to only the stroke signal from the stroke sensor 50.

Figure 8:
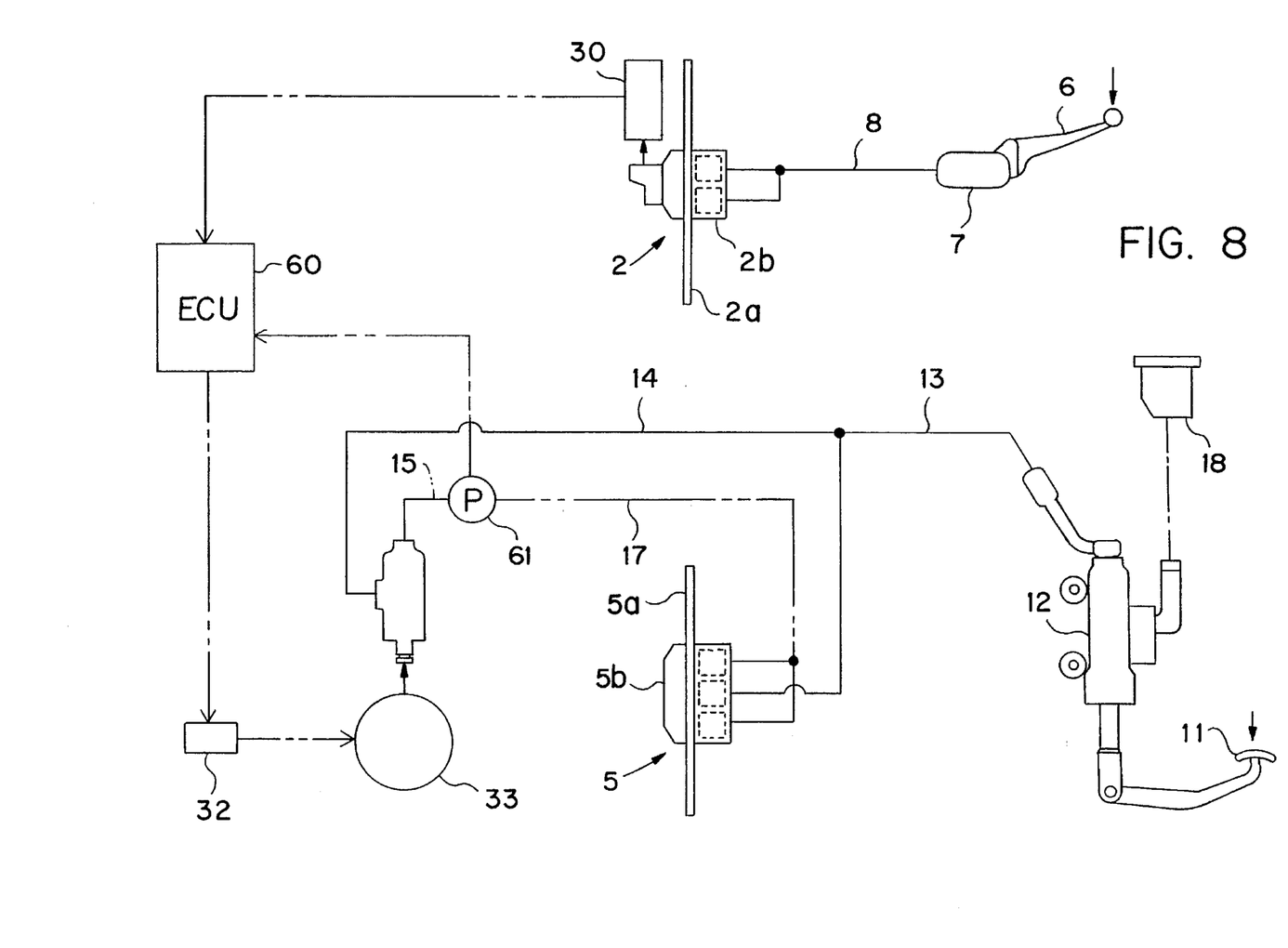
FIG. 8 is a diagram showing a brake system according to a sixth preferred embodiment of the present invention.

FIG. 8 shows a sixth preferred embodiment of the present invention. This preferred embodiment differs from the third preferred embodiment shown in FIG. 5 by providing a hydraulic pressure controller connected between the secondary master cylinder 10 and the rear brake 5. That is, a torque signal output from the detector 30 is input into an ECU 60 as the control device in the present invention. Then, the ECU 60 operates the actuator 33 through the relay 32 according to the torque signal to generate a hydraulic pressure in the secondary master cylinder 10.

The hydraulic pressure from the secondary master cylinder 10 which is supplied to a pressure control circuit 17 is the greater of the hydraulic pressure generated from the primary master cylinder 12 of the pedal 11 and the hydraulic pressure generated by the actuator 33.

A pressure sensor 61 is provided in the pressure control circuit 17 to detect the hydraulic pressure generated from the secondary master cylinder 10. A pressure signal output from the pressure sensor 61 is always fed back to the ECU 60.

With this arrangement, the control valve 16 can be omitted and it is only necessary to instead provide the pressure sensor 61. Accordingly, the configuration of the front/rear interlocking brake system can be made simpler.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle brake device comprising:
    a front brake operatively mounted relative to a front wheel and a rear brake operatively mounted relative to a rear wheel of a motorcycle,
    said front brake being operated by a first hydraulic pressure and said rear brake being operated by a second hydraulic pressure and a third hydraulic pressure;
    a lever operatively connected to the motorcycle;

a lever hydraulic system operatively connected to said front brake for supplying the first hydraulic pressure to said front brake responsive to operation of said lever;

a lever interlocking hydraulic system operatively connected to said rear brake, for selectively supplying the second hydraulic pressure to said rear brake when said lever is operated;

a pedal operatively connected to the motorcycle; and a pedal hydraulic system operatively connected to said rear brake for directly supplying the third hydraulic pressure only to said rear brake responsive to operative of said pedal.

2. The motorcycle brake device according to claim 1, wherein said lever interlocking hydraulic system includes a secondary master cylinder for generating the second hydraulic pressure responsive to operation of said lever.

3. The motorcycle brake device according to claim 2, wherein generation of the second hydraulic pressure in said secondary master cylinder is controlled by a control device operatively connected to and responsive to operation of said lever.

4. The motorcycle brake device according to claim 3, further comprising detecting means for detecting a brake torque of said front brake, wherein said control device controls said secondary master cylinder according to a signal output from said detecting means.

5. The motorcycle brake device according to claim 4, further comprising a control valve operatively connected to said lever interlocking hydraulic system, wherein the second hydraulic pressure generated by said secondary master cylinder is controlled by said control valve.

6. The motorcycle brake device according to claim 4, wherein a pressure signal indicative of the second hydraulic pressure generated by said secondary master cylinder is fed back to said control device to control the second hydraulic pressure.

7. The motorcycle brake device according to claim 3, further comprising a brake switch, wherein said control device controls said secondary master cylinder according to a signal output from said brake switch indicative of said lever being opened and closed and a pressure signal indicative of the first hydraulic pressure supplied from said lever hydraulic system.

8. The motorcycle brake device according to claim 7, further comprising a control valve operatively connected to said lever interlocking hydraulic system, wherein the second hydraulic pressure generated by said secondary master cylinder is controlled by said control valve.

9. The motorcycle brake device according to claim 7, wherein a pressure signal indicative of the second hydraulic pressure generated by said secondary master cylinder is fed back to said control device to control the second hydraulic pressure.

10. The motorcycle brake device according to claim 3, wherein said control device controls said secondary master cylinder according to a predetermined rotation of said lever.

11. The motorcycle brake device according to claim 10, further comprising a control valve operatively connected to said lever interlocking hydraulic system, wherein the first hydraulic pressure generated by said secondary master cylinder is controlled by said control valve.

12. The motorcycle brake device according to claim 10, wherein a pressure signal indicative of the second hydraulic pressure generated by said secondary master cylinder is fed back to said control device to control the hydraulic pressure.

13. The motorcycle brake device according to claim 3, further comprising a control valve operatively connected to said lever interlocking hydraulic system, wherein the second hydraulic pressure generated by said secondary master cylinder is controlled by said control valve.

14. The motorcycle brake device according to claim 3, wherein a pressure signal indicative of the second hydraulic pressure generated by said secondary master cylinder is fed back to said control device to control the second hydraulic pressure.

15. The motorcycle brake device according to claim 2, further comprising a control valve operatively connected to said lever interlocking hydraulic system, wherein the second hydraulic pressure generated by said secondary master cylinder is controlled by said control valve.

16. The motorcycle brake device according to claim 2, wherein said secondary master cylinder generates the second hydraulic pressure in accordance with a brake torque of said front brake.

17. The motorcycle brake device according to claim 16, further comprising a control valve operatively connected to said lever interlocking hydraulic system, wherein the second hydraulic pressure generated by said secondary master cylinder is controlled by said control valve.

18. The motorcycle brake device according to claim 2, wherein said secondary master cylinder is operated by a wire operatively connected to said lever.

19. The motorcycle brake device according to claim 18, further comprising a control valve operatively connected to said lever interlocking hydraulic system, wherein the second hydraulic pressure generated by said secondary master cylinder is controlled by said control valve.

20. A motorcycle brake device comprising:

a front brake operatively mounted relative to a front wheel and a rear brake operatively mounted relative to a rear wheel of a motorcycle, said front brake being operated by a first hydraulic pressure and said rear brake being operated by a second hydraulic pressure and a third hydraulic pressure;

a lever operatively connected to the motorcycle;

a lever hydraulic system operatively connected to said front brake for supplying the first hydraulic pressure to said front brake responsive to operation of said lever;

a lever interlocking hydraulic system, operatively connected to said rear brake, for selectively supplying the second hydraulic pressure to said rear brake when said lever is operated;

a pedal operatively connected to the motorcycle;

a pedal hydraulic system operatively coupled to said rear brake for directly supplying the third hydraulic pressure only to said rear brake responsive to operation of said pedal; and a secondary master cylinder operatively connected to the first hydraulic pressure supplied to said front brake and the third hydraulic pressure supplied to said rear brake, for selectively comparing and determining the higher of the first and third hydraulic pressures and supplying the higher of the first and third hydraulic pressures to said lever interlocking hydraulic system as the second hydraulic pressure, exclusive operation of said pedal only supplies the third hydraulic pressure directly only to said rear brake and operation of a) said lever exclusively and b) said lever and said pedal together interlockingly operate said front brake and said rear brake.

21. A vehicle brake device comprising:

a front brake operatively mounted relative to a front wheel and a rear brake operatively mounted relative to a rear wheel of a vehicle, a front brake being operated by a first hydraulic pressure and said rear brake being operated by a second hydraulic pressure and a third hydraulic pressure;

a lever operatively connected to said vehicle;

a lever hydraulic system operatively connected to said front brake for supplying the first hydraulic pressure to said front brake responsive to operation of said lever;

a lever interlocking hydraulic system operatively connected to said rear brake, for selectively supplying the second hydraulic pressure to said rear brake when said lever is operated;

a pedal operatively connected to the vehicle; and a pedal hydraulic system operatively connected to said rear brake for directly supplying the third hydraulic pressure only to said rear brake responsive to operation of said pedal.

22. The vehicle brake device according to claim 21, wherein said lever interlocking hydraulic system includes a secondary master cylinder for generating the second hydraulic pressure responsive to operation of said lever.

23. The vehicle brake device according to claim 22, wherein generation of the second hydraulic pressure in said secondary master cylinder is controlled by a control device operatively connected to and responsive to operation of said lever.

24. The vehicle brake device according to claim 23, further comprising detecting means for detecting a brake torque of said front brake, wherein said control device controls said secondary master cylinder according to a signal output from said detecting means.

25. The vehicle brake device according to claim 23, further comprising a brake switch, wherein said control device controls said secondary master cylinder according to a signal output from said brake switch indicative of said lever being opened and closed and a pressure signal indicative of the first hydraulic pressure supplied from said lever hydraulic system.

26. The vehicle brake device according to claim 23, wherein said control device controls said according to master cylinder according to a predetermined rotation of said lever.

27. The vehicle brake device according to claim 23, wherein a pressure signal indicative of the second hydraulic pressure generated by said secondary master cylinder is fed back to said control device to control the second hydraulic pressure.

28. The vehicle brake device according to claim 22, wherein said secondary master cylinder generates the second hydraulic pressure in accordance with a brake torque of said front brake.

29. The vehicle brake device according to claim 22, wherein the secondary master cylinder is operated by a wire operatively connected to said lever.

30. The vehicle brake device according to claim 22, further comprising a control valve operatively connected to said lever interlocking hydraulic system, wherein the second hydraulic pressure generated by said secondary master cylinder is controlled by said control valve.

31. A vehicle brake device comprising:

a front brake operatively mounted relative to a front wheel and a rear brake operatively mounted relative to a rear wheel of a vehicle, said front brake being operated by a first hydraulic pressure and said rear brake being operated by a second hydraulic pressure and a third hydraulic pressure;

a lever operatively connected to the vehicle;

a lever hydraulic system operatively connected to said front brake for supplying the first hydraulic pressure to said front brake responsive to operation of said lever;

a lever interlocking hydraulic system, operatively connected to said rear brake, for selectively supplying the second hydraulic pressure to said rear brake when said lever is operated;

a pedal operatively connected to the vehicle;

a pedal hydraulic system operatively coupled to said rear brake for directly supplying the third hydraulic pressure only to said rear brake responsive to operation of said pedal; and a secondary master cylinder operatively connected to the first hydraulic pressure supplied to said front brake and the third hydraulic pressure supplied to said rear brake, for selectively comparing and determining the higher of the first and third hydraulic pressures and supplying the higher of the first and third hydraulic pressures to said lever interlocking hydraulic system as the second hydraulic pressure, exclusive operation of said pedal only supplies the third hydraulic pressure directly only to said rear brake and operation of a) said lever exclusively and b) said lever and said pedal together interlockingly operate said front brake and said rear brake.

* * * * *